H. M. Scott,
Bed Bottom.
N° 26,235. Patented Nov. 22, 1859.
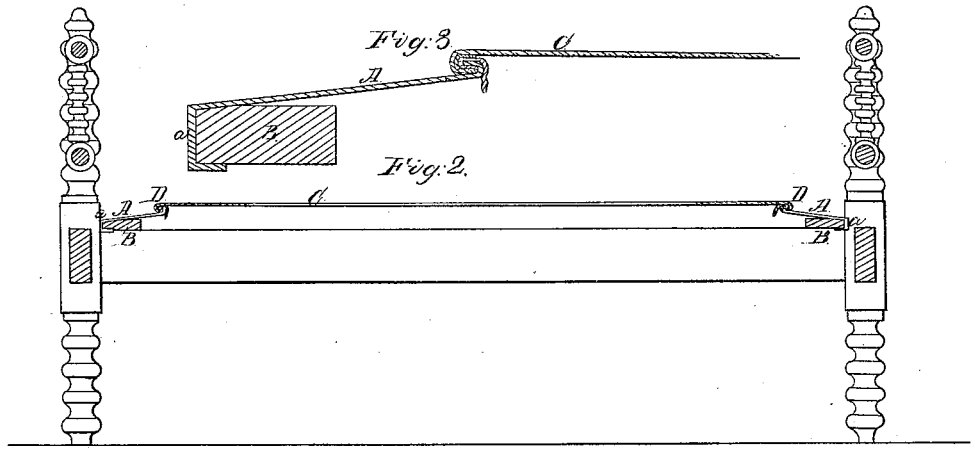
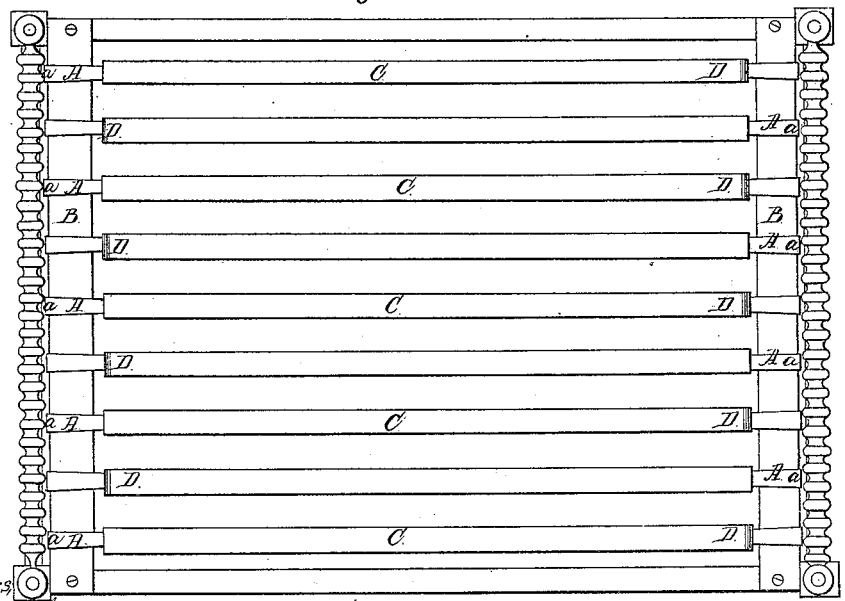
Witnesses
Sam. Adam Jr.
John W. Munyg
Inventor:
Henry M. Scott

UNITED STATES PATENT OFFICE.

HENRY M. SCOTT, OF PORTLAND, MAINE, ASSIGNOR TO HIMSELF AND SAML. ADLAM, OF SAME PLACE.

BED-BOTTOM SPRING.

Specification of Letters Patent No. 26,235, dated November 22, 1859.

*To all whom it may concern:*

Be it known that I, HENRY M. SCOTT, of Portland, in the county of Cumberland and State of Maine, have invented a new and Improved Spring for Bed-Bottoms; and I do hereby declare that the following is a full, clear, and exact description of the same, reference being had to the accompanying drawing, making part of this specification, in which—

Figure 1 represents a plan or top view of a bed bottom arranged according to my invention. Fig. 2 is a longitudinal vertical section of ditto. Fig. 3 is an enlarged sectional view of my spring.

Similar letters in the three views refer to corresponding parts.

This invention consists in a particular arrangement of a spring, hook and clamp that serves to attach the webbing to the frame of the bedstead in such a manner that the slack can readily be taken in.

To enable those skilled in the art to make and understand my invention I will proceed to describe it.

Whenever webbing or some other textile, or fibrous substance is used for bed bottoms it is found difficult to take in the slack which will form invariably after the bottom has been in use for a certain time. This difficulty takes place more particularly with webbing, which is fastened by means of nails so that it is not only tiresome to take the ends off and refasten them, but it is also injurious both to the frame and to the webbing. With my device, on the other hand, the slack can be taken in at any time without injury either to the frame or to the webbing, and each strip of webbing can be shifted or taken out and replaced entirely independent from the rest.

I use double spring hooks, A, that hook with one end, $a$, over slats, B, which are nailed across the frame and near to its ends, as clearly shown in Figs. 1 and 2. The other ends, $b$, of said hooks serve to retain the strips of webbing, C, the ends of which are placed over said hooks, as clearly shown in Fig. 3, and secured to the same by means of clamps, D. These clamps are made of the same width as the webbing, so as to give a good strong hold to the same, and they can be made of cast iron or of wrought iron or of any other suitable material. The end, $b$, of the hook or spring, A, is bent over so closely as to just admit the double thickness of the webbing together with one end of the clamp.

In order to fasten the webbing one end of each strip is fastened in the spring hooks on one side of the bedstead, and each strip is now drawn up taut, the spring hook on the other side is depressed and the end fastened by the clamp.

The single strips of webbing may be brought as close as desired and it takes less clothing under a person to keep the body in a comfortable position with my bottom than with any other bottom as now in use, and the elasticity of the webbing combined with that of the spring hooks renders my bottom very easy.

If one or more of the strips of webbing become slack it is quite easy to tighten them up by taking out the clamp and by refastening the strip of webbing in the same manner as above described.

What I claim as new, and desire to secure by Letters Patent, is:—

The employment of spring hooks, A, and clamps, D, substantially as described, for the purpose of attaching strips of webbing to the frame of a bedstead.

HENRY M. SCOTT.

Witnesses:
JOHN W. MUNGER,
SAML. ADLAM, Jr.